Patented Dec. 17, 1940

2,225,059

UNITED STATES PATENT OFFICE 2,225,059

PROCESS FOR CATALYTIC HYDROGENATION OF HIGHER ALIPHATIC NITRILES

Wilbur A. Lazier, Wilmington, Del., assignor to E. I. du Pont de Nemours & Company, Wilmington, Del., a corporation of Delaware No Drawing. Application September 28, 1938, Serial No. 232,085

7 Claims. (Cl. 260—583)

This invention relates to catalytic processes and more particularly to processes for the continuous catalytic hydrogenation of aliphatic nitriles to the corresponding aliphatic amines.

This application is a continuation-in-part of my co-pending application Serial No. 196,369, filed March 17, 1938, which has become U. S. Patent 2,200,282.

Catalytic hydrogenation processes have been practiced for many years in the conversion of a wide variety of unsaturated organic compounds into the corresponding saturated derivatives. An outstanding example of this general procedure is found in the hardening of fats which has assumed considerable importance as an industrial process. In general, such contact processes have proved to be more economical and efficient than competitive processes involving the use of chemical reducing agents such as metallic sodium, zinc dust, and iron powder.

The usual method for conducting catalytic hydrogenation comprises suspending a metallic catalyst in a liquid medium containing the material to be hydrogenated and agitating the mixture with hydrogen gas until the required quantity of hydrogen has been absorbed. This batchwise method of hydrogenation has the advantage that sufficient time may be allowed for the process to reach any desired stage of completion. It has the disadvantage that the process is discontinuous and hence more costly than if the equipment could be kept in constant use. Continuous hydrogenation involves so many serious technical difficulties that its use has heretofore been largely restricted to gaseous systems.

Among other compounds, aliphatic nitriles have been subjected to a discontinuous hydrogenation process in order to produce the corresponding aliphatic amines. For example, in copending application Serial No. 127,203, filed February 23, 1937, which has become U. S. Patent 2,166,151, there is disclosed a process for the preparation of hexamethylenediamine which consists in suspending a finely divided active nickel hydrogenation catalyst in a liquid mixture of adiponitrile and anhydrous ammonia and introducing hydrogen under pressure with agitation until there is no further absorption of hydrogen under the conditions employed. This process is a batch or discontinuous process, however; consequently, the hydrogenation process is suspended after no more hydrogen is absorbed under the conditions employed, the reaction vessel discharged, and if a further run is to be made, recharged.

It is an object of this invention to provide a process for the catalytic hydrogenation of aliphatic nitriles in a continuous manner which obviates the disadvantages inherent to batch or discontinuous processes. A further object is to provide a process whereby adiponitrile is hydrogenated smoothly and continuously to hexamethylenimine, hexamethylenediamine, and/or epsilonaminocapronitrile. Other objects will appear hereinafter.

According to the present invention, I have found that it is entirely feasible and vastly more economical to carry out the hydrogenation of aliphatic nitriles in a continuous manner by any one of several specific procedures set forth in detail below. Contrary to expectations, it has been found that when aliphatic nitriles are exposed in thin layers to contact with the surface of suitable hydrogenating catalysts so as to facilitate diffusion of dissolved hydrogen to the catalytic surface, hydrogenation is exceedingly rapid and reaches completion in a sufficiently short time to permit a high output of completely hydrogenated products from a relatively small reaction space.

The objects of this invention are acomplished, more specifically, by a process which comprises bringing a heated fluid mixture comprising essentially ammonia, hydrogen, and an aliphatic nitrile containing at least six carbon atoms continuously into contact with a stationary solid hydrogenation catalyst. The ammonia and the nitrile may be commingled first and the mixture allowed to join a stream of hydrogen enroute to the catalyst chamber, or separate streams of the individual reactants may be allowed to converge in any suitable manner in order that a proper proportioning may be secured. Again, the hydrogen may be wholly or partially dissolved under high pressure in one or both of the nitrile and ammonia components of the reaction system. In any event, hydrogen is employed in an amount in excess of that required for complete conversion of the nitrile to the corresponding amine. Ammonia is preferably used in an amount at least stoichiometrically equivalent to the nitrile. The hydrogenation catalyst is employed preferably in the form of briquettes, pellets, or grains of more or less uniform size and shape, and the stream of reactants is passed at such a rate that the materials undergoing the catalyzed conversion remain in contact with the catalyst for sufficient but not excessive periods of time. In actual practice, the invention contemplates the separation, recovery, and recycle of unreacted ammonia and hydrogen. A more complete outline of specific embodiments of the continuous processes of this invention is to be found in the following examples, which are to be regarded as illustrative but not limitative.

*Example I.*—A cobalt chromite catalyst modified by the addition of about 10 mole per cent of cadmium, as more fully described in Example XI of U. S. 2,116,552, was compressed into briquettes which were broken and sized to 8–14 mesh grains. Twenty-five cc. of this catalyst was loaded into a pressure-resisting cylindrical vessel which was arranged in a vertical position and equipped for heating with a boiling vapor bath. After giving the catalyst a preliminary reduction at 335° C. for 2 hours, a mixture of 72 cc. of liquid ammonia and 48 g. of caprylonitrile was passed downward through the catalyst per hour together with about 2.8 cu. ft. of hydrogen (calculated as if at standard conditions of temperature and pressure). However, the temperature of the catalyst and reaction mixture was maintained at 335° C., while the total pressure on the reaction system was about 208 atmospheres. The effluent product was condensed by cooling and separated from the recovered hydrogen and ammonia. Analysis indicated that 88% of the caprylonitrile had been converted into n-octyl amines of which about 61% was the primary n-octyl amine and about 27% the secondary n-octyl amine. In a similar manner, lauronitrile is converted smoothly into the corresponding dodecylamines.

*Example II.*—The mixed nitriles corresponding to the fatty acids present in coconut oil and prepared by passing coconut oil acids with ammonia over a dehydrating catalyst are converted by a continuous hydrogenation process to a mixture of the corresponding long-chain aliphatic amines. The catalyst used consists of briquetted grains of basic cobalt carbonate which have been subjected to a preliminary reduction to the metal by hydrogen. In apparatus similar to that disclosed in Example I, a mixture consisting of one part by volume of the liquid nitriles and 3 parts by volume of liquid ammonia is allowed to flow continuously downward through the catalyst bed while hydrogen under pressure is passed countercurrently upward through the catalyst. The flow of the liquid mixture is so regulated that about 2 or 3 volumes are allowed to traverse each volume of catalyst space per hour. The hydrogen flow is so regulated that about 10 moles of molecular hydrogen are passed upwards per mole of nitrile descending. Owing to the exothermic nature of the reaction, the temperature, after the reaction has been initiated, is maintained at about 300–325 by suitable cooling. The pressure is also regulated between 150–200 atmospheres. The unused hydrogen is removed from the top of the reaction system by a gas recirculating pump which reintroduces it at the bottom of the system. A liquid-gas separator serves to separate the liquid products and excess ammonia, the latter being distilled off and recycled to the process. Any nitriles that have been incompletely converted may be recovered by acid extraction of the crude amines to remove the soluble amine hydrochlorides, after which the unconverted material may be neutralized and returned to the process for rehydrogenation. In this way, the yield of amines from the nitriles becomes practically quantitative.

In a similar manner oleonitrile and stearonitrile may be converted into the corresponding amines.

*Example III.*—A gaseous mixture containing 3.5 parts by volume of ammonia and 5.25 parts by volume of hydrogen is passed through a vertically mounted reaction tube at the rate of 8.75 moles per hour. In traversing the tube, the gases pass through a preheating section consisting of 300 cc. of 8–14 mesh fused quartz, which is maintained at 350° C., and a catalyst bed comprising 200 cc. of reduced nickel-on-kieselguhr pellets heated to 180° C. Liquid adiponitrile is introduced into the reaction tube at the rate of about 20 g. per hour from a suitable feeding device. The nitrile is rapidly vaporized in the preheating section and swept over the catalyst. A mildly exothermic reaction occurs with the absorption of substantial amounts of hydrogen. The gaseous products issuing from the tube are condensed in a suitable receiver. From 230 g. of adiponitrile processed during 10.7 hours there is obtained 136 g. of liquid condensate. Fractional distillation of the crude product gives 18 g. of a water-hexamethylene imine binary, B. P. 93° to 96° C., 96.9 g. of hexamethylene imine, B. P. 135° to 138° C., and 24.2 g. of higher boiling mixed products of indefinite composition. The yield of hexamethylene imine is approximately 50% of theory.

*Example IV.*—Two hundred and forty grams of adiponitrile is passed with hydrogen and ammonia over a nickel-on-alumina catalyst under the conditions described in Example I. There is obtained 163.7 g. of liquid condensate together with some non-condensible gaseous products. Fractional distillation of the liquid yields the following hydrogenation products: (1) hexamethylene imine-water binary, B. P. 93° to 96° C., 46.6 g.; (2) hexamethylene imine, B. P. 135° to 138° C., 40.9 g.; and (3) high boiling fractions, 54.7 g. The fraction B. P. 130° C./27 mm. apparently is the incompletely hydrogenated product epsilon-amino capronitrile.

*Example V.*—A cobalt-copper catalyst was prepared by fusing together a mixture containing 2 parts by weight of cobalt oxide and one part of copper oxide. The fusion mass was crushed and screened to 8–14 mesh grains which were thereafter reduced in a hydrogen-carbon dioxide mixture at progressively increased temperatures up to 375° C. until the oxides had been substantially completely reduced to the metals.

Fifty cc. of the reduced catalyst weighing 124 g. was charged into a vertically mounted cylindrical vessel constructed to withstand high pressures. The catalyst was maintained at a temperature of 125° C. while a liquid mixture of ammonia and adiponitrile was passed upwards through the catalyst together with a cocurrent flow of hydrogen under high pressure. The rate of feed was about 77 g. of ammonia and about 20 g. of adiponitrile per hour. Hydrogen was drawn through the reaction system at such a rate that after expanding to atmospheric pressure and cooling to ordinary temperature, the rate of drawoff was about 9 cu. ft. per hour. A total pressure of 600–630 atmospheres was maintained on the reaction system.

After drawing off the liquid products and eliminating the excess ammonia, it was found that conversion of the adiponitrile to amino compounds was substantially complete. The concentration of hexamethylenediamine present corresponded to a 92% conversion of the adiponitrile to hexamethylenediamine.

Although the foregoing examples describe the use of certain definite conditions of temperature, pressure, concentrations of reactants, and the like, it is to be understood that these values may be varied somewhat within the scope of the invention. Broadly speaking, the continuous hydrogenation of nitriles according to this invention may be carried out at temperatures ranging from about 110° to 350° C. under pressures in the range of from one atmosphere up to 1000 atmospheres. The amount of ammonia required will depend on the particular nitrile undergoing hydrogenation as well as the temperature and other conditions. In general, however, an amount of ammonia in molecular excess of the nitrile will be suitable.

In the practice of this invention there may be employed as catalysts the hydrogenating metals of group 8 and of subgroup B in groups 1 and 2 in the periodic table, either alone, in admixture, or combined with a difficultly reducible oxide of a metal of the 6th group. For example, nickel or cobalt and nickel-cadmium chromite are especially effective. These catalytic materials are preferably used in a finely divided form and may be deposited on a porous support such as pumice, kieselguhr, alumina gel, and silica gel. Catalyst powders are conveniently prepared for use in the process by compressing into pellets or briquettes of suitable size. Stabilized catalysts containing a substantial proportion of oxide, catalysts comprising the carbonate, oxide or hydroxide of the hydrogenating metal deposited on an inert porous support, and catalysts in which the hydrogenating metal is combined with a non-reducible oxide are preferably reduced in a stream of hydrogen-containing gas prior to exposure to the reaction gases.

It has been found convenient and effective to prepare continuous hydrogenation catalysts by fusing together a mixture of two or more fusible metal oxides such as cobalt oxide and copper oxide. The fused mass is cooled, crushed, sized, and the oxides reduced to the metals with hydrogen. Cobalt-copper mixtures have been found to be most effective catalysts, but other hydrogenating metals may be used, for example, copper-iron, copper-silver, and copper-nickel. In such mixed catalyst compositions the copper may constitute from 5 to 95 mole per cent of the mixture.

It will be apparent from the above description that I have made a fundamental advance in the art of hydrogenating nitriles. In this comparatively obscure and restricted field of unsaturated compounds a degree of success in devising a continuous process for hydrogenation has been attained that has not been enjoyed heretofore in the case of other technically important hydrogenation reactions. The continuous processes of this invention are not only valuable from the standpoint of decreasing operating costs in hydrogenation, but high yields have been obtained in some cases that apparently cannot be had by discontinuous operation.

Various changes may be made in the details and methods of operation of this invention without departing therefrom or sacrificing the advantages thereof.

I claim:
1. The process of bringing a fluid reaction mixture comprising essentially ammonia, hydrogen, and an aliphatic nitrile containing at least 6 carbon atoms continuously into contact with a stationary, solid hydrogenation catalyst whereby to effect a conversion of the nitrile to an amine, characterized by the fact that the nitrile is exposed in thin layers to contact with the surface of the catalyst.

2. The process which comprises catalytically hydrogenating, in a continuous manner and at a temperature in the range of from 110 to 350° C., a fluid mixture of a higher aliphatic nitrile, containing at least 6 carbon atoms, and an excess of ammonia and hydrogen, characterized by the fact that the nitrile is exposed in thin layers to contact with the surface of the catalyst.

3. The process which comprises catalytically hydrogenating, in a continuous manner at a pressure in the range of from one to one thousand atmospheres and at a temperature in the range of from 110° to 350° C., a fluid mixture of a higher aliphatic nitrile containing at least six carbon atoms and an excess of ammonia and hydrogen, characterized by the fact that the nitrile is exposed in thin layers to contact with the surface of the catalyst employed.

4. The process of claim 1 wherein the excess ammonia and hydrogen are separated from the said amine and are continuously recycled with fresh nitrile.

5. The process of claim 1 wherein the hydrogenation catalyst comprises essentially a granular form of catalytically active cobalt.

6. The process of claim 1 wherein the hydrogenation catalyst comprises as a substantial ingredient copper and a hydrogenating metal of the iron group.

7. The process of claim 1 wherein the hydrogenation catalyst comprises a reduced granular mass obtainable by fusing together copper oxide and cobalt oxide, followed by crushing and reduction with hydrogen.

WILBUR A. LAZIER.